Feb. 2, 1960    F. S. FLICK ET AL    2,923,276
HEAD STRUCTURE FOR A PISTON AND CYLINDER DEVICE
Filed Dec. 12, 1955    2 Sheets-Sheet 1

Inventors:
Francis S. Flick
Walter J. Kudlaty
By: Schroeder, Hofgren,
Brady & Wegner
Attorneys

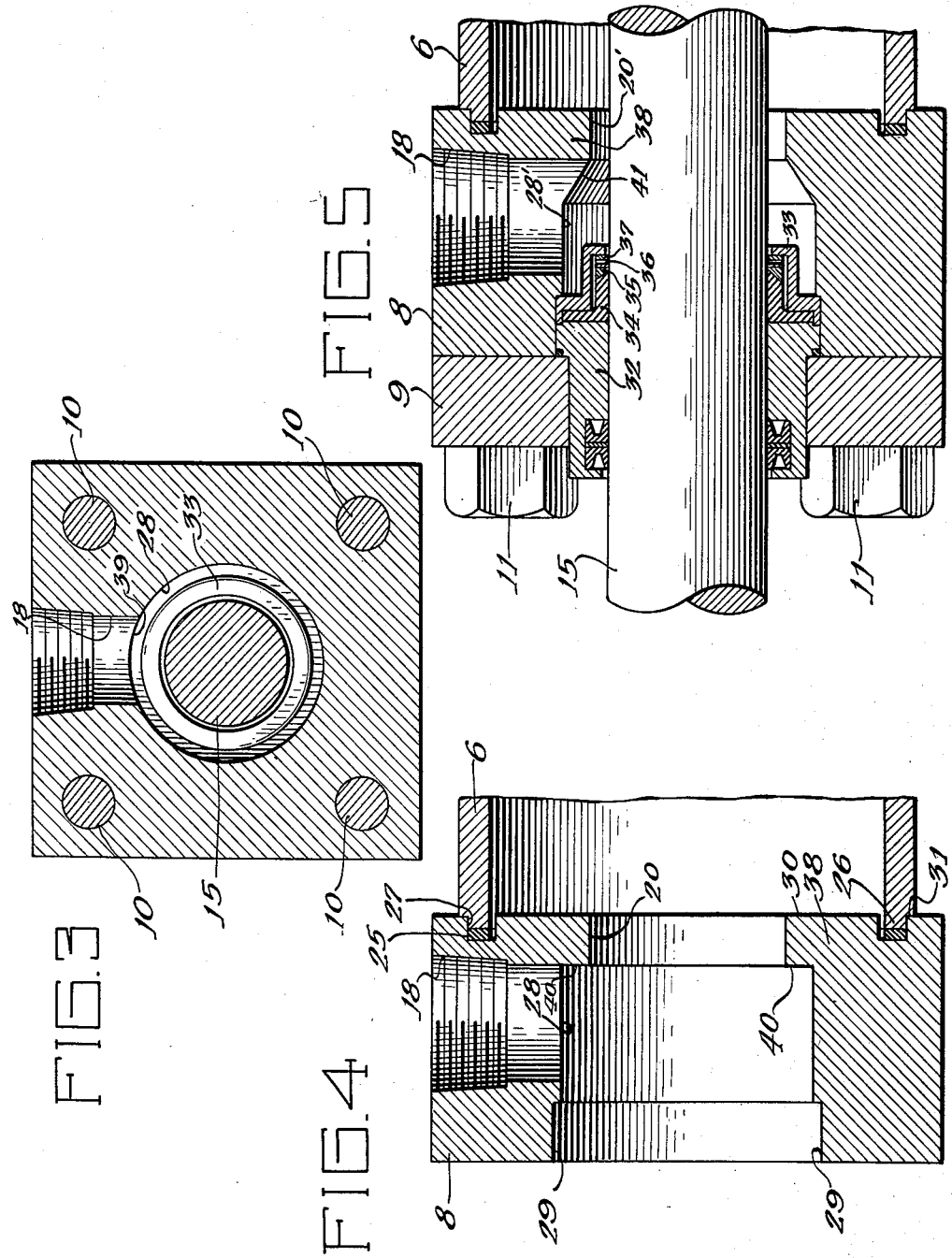

United States Patent Office 2,923,276
Patented Feb. 2, 1960

2,923,276

HEAD STRUCTURE FOR A PISTON AND CYLINDER DEVICE

Francis S. Flick, Oak Park, and Walter J. Kudlaty, Elmhurst, Ill., assignors to Flick-Reedy Corporation, a corporation of Illinois Application December 12, 1955, Serial No. 552,376

2 Claims. (Cl. 121—38)

This invention relates to a head structure for a fluid pressure operated piston and cylinder device.

Piston and cylinder devices operated by pneumatic or hydraulic mediums have been used as motors in various fields for many years. Their present use in machine tools or industrial plants is of increasing importance. Many of the operations of a large machine tool, particularly the work handling procedures, are now being operated with hydraulic piston and cylinder devices. It is important that these fluid motors operate properly over a long period of time without repair.

One of the difficulties with previous piston and cylinder devices has been leakage of motor fluid. Any misalignment of the parts of the cylinder may cause wear of the sealing structures unevenly so as to contribute to early seal failure. Such wear on the seal structures shortens the time that the fluid motor will operate satisfactorily without leakage. One of the objects of this invention is to provide head structure for a piston and cylinder device which will maintain concentricity between the cylinder and head. Such a structure inherently increases the length of life of the seals.

Another problem with piston and cylinder devices has been the limitations on speed of operation. This limitation has been primarily due to restrictions in the fluid flow passages to the cylinder. Ordinarily, the piping can be chosen to provide the required fluid flow volume to the cylinder. The parts which have caused the restriction have generally been within the head of the cylinder. It is, therefore, another object of the present invention to provide a head structure having a fluid flow passage therethrough which does not throttle the introduction of fluid to the cylinder.

Another object of the invention is to provide a head structure for a piston and cylinder device which may easily be formed so as to maintain concentricity between the cylinder and a piston rod.

Other objects, features and advantages of the present invention will be apparent from the following description of embodiments illustrated in the drawings in which:

Figure 3 is a sectional view taken through the head structure substantially along line 3—3 in Figure 1;

Figure 4 is an enlarged fragmentary sectional view through the head structure with the piston rod and bushing removed; and Figure 5 is a fragmentary sectional view through a modified form of the head structure.

The piston and cylinder device chosen for purposes of illustrating the invention is one intended for use with a high pressure hydraulic operating medium. Generally, similar parts of the device will be present in low pressure hydraulic devices as well as in cylinders intended for use with air.

Figure 1:
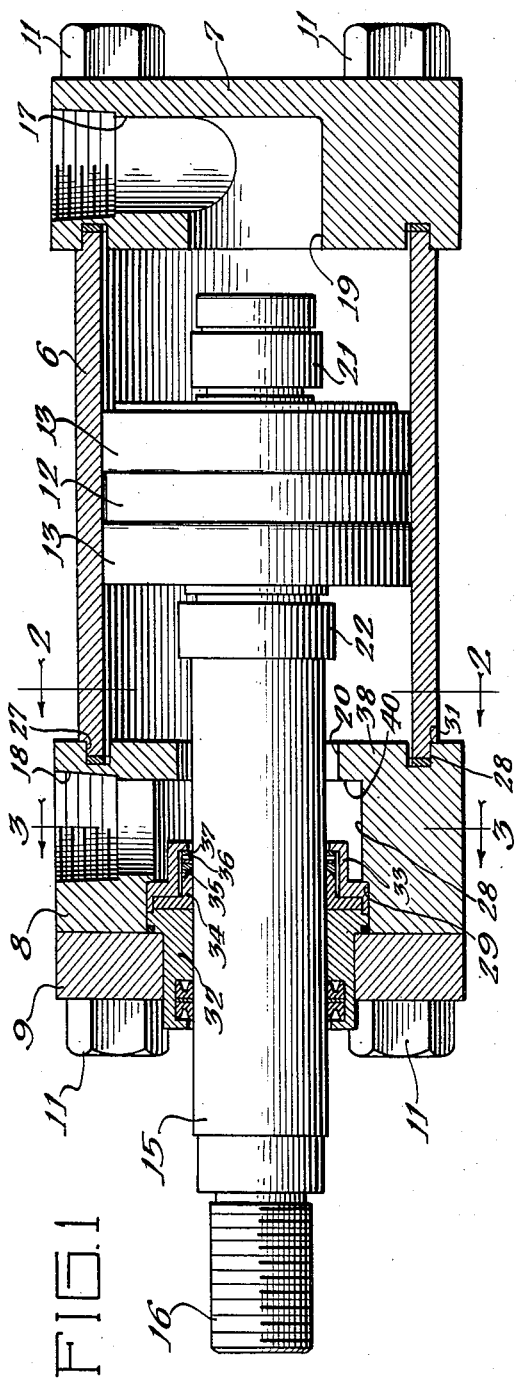
Figure 1 is a verticle elevational view showing a piston and cylinder device in section and embodying the head structure of the present invention.

In general, the parts of the piston and cylinder include a cylinder tube 6 joined at one end to a cap 7 and at the other end with a head 8 against which a retainer plate 9 bears. Tie rods 10 pass through the cap, head and retainer plate and are provided with nuts 11 bearing on the outer surfaces of the cap and plate for holding the parts in assembled relation as illustrated in Figure 1.

A piston 12 is reciprocally mounted within the cylinder tube 6. Cup seals 13 are held on the piston for sealing against the inner surface of the cylinder tube. The piston is mounted upon a piston rod 15 having an outer threaded end 16 for attachment to a device to be moved.

Fluid for moving the piston within the cylinder may be admitted to either side of the piston. A port 17 in the cap 7 is provided for conducting fluid to the right hand side of the piston illustrated in Figure 1. A similar port 18 is provided in the head 8 for conducting fluid to the left hand side of the piston. The port 17 in the cap is relatively free of restriction since the device illustrated has a piston rod passing only through the head. The port 18 in the head structure, however, communicates with a passage through the head partially occupied by the piston rod. Both ports, however, are equipped with horizontal portions 19 and 20 respectively which communicate with the interior of the cylinder. A cushion plunger 21 may enter the portion 19 of the port in the cap for retarding the movement of the piston near the end of its stroke. A similar cushion plunger 22 on the rod end of the piston may enter the portion 20 of the port in the head for the same purpose.

The head structure of this invention is best illustrated in Figure 4. The cylinder tube 6 is secured to the head structure and held in concentric alignment with the stepped bore through the head. A circular groove 25 is machined in the cylinder facing portion of the head so as to receive a reduced thickness section 26 on the end of the cylinder tube. The outer surface 27 of the square sided groove is machined absolutely concentric with the stepped bore. The bore itself has the smaller portion 20 referred to above, an intermediate portion 28 and a still larger portion 29 near the outer end. The concentricity referred to is maintained in the manufacture of the head wherein the square head is placed in a fixture and rotated with cutting tools operating both on the stepped bore and the circular groove at one and the same time.

The present head structure lends itself quite easily to manufacturing steps which will result in maintaining concentricity between the head and the cylinder. The cylinder facing surface 30 of the head may be ground within quite close tolerances so as to be normal to the carefully machined surface 27 in the circular groove. By facing off the end of the cylinder tube so that the shoulder 31 may abut this ground surface while the surface 27 of the groove is piloting or guiding the cylinder into mating relation with the head, absolute concentricity results. The concentricity between the cylinder and the stepped bore is thus assured so that a piston rod bushing such as that indicated by numeral 32 may support the piston rod 15 for travel along the axis of the bore.

Referring again to Figure 1, the piston rod bushing 32 maintains the rod centered within the head. A piston rod seal structure may be secured to the bushing or placed in the larger portion 29 of the stepped bore. Herein a cage 33 for the flange seal 34, the follower ring 35, spring washer 36 and backing washer 37 are shown as held in position within the larger portion of the stepped bore. This piston rod seal extends into the intermediate bore portion 28 but does not occupy all of the space therein.

Figure 2:
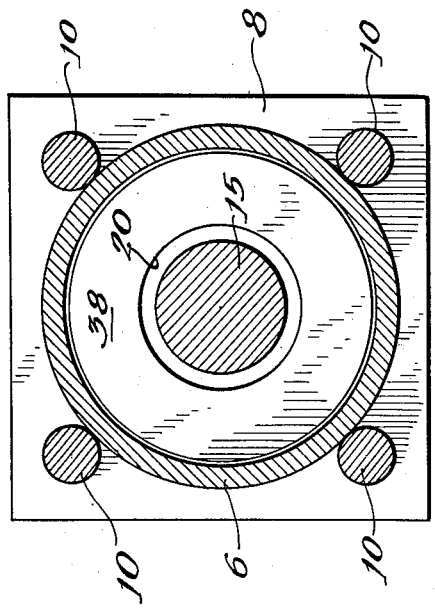
Figure 2 is a sectional view through the cylinder taken substantially along line 2—2 in Figure 1.

Fluid flow through the port in the head of the cylinder into the cylinder tube must pass around the piston rod, The space between the rod 15 and the smaller portion 20 of the bore is annular in shape as best seen in Figure 2. Ordinarily, it is preferred that the metal portion 38 of the head exposed to the pressure within the cylinder be as wide as possible. The opening between the bore portion 20 and the rod, however, may be made sufficiently large to admit the desired amount of fluid.

The port 18 in the head may also be generally made of sufficient size to handle the desired amount of fluid flow to the cylinder. The restriction in the fluid passage has primarily been caused by the intersection of the fluid port 18 with the central bore through the head. In the present invention, this restriction is removed. Referring particularly to Figure 3, it will be noted that the piston rod 15 is spaced from the intersection line 39 between the port 18 and the intermediate bore portion 28, a considerable distance appearing as greater in section than the space around the piston rod through which the fluid must pass, to enter the cylinder. By providing the intermediate bore portion 28 larger than the portion 20, the previous restriction found is removed. The fluid entering through the port strikes the piston rod and must travel either around the rod or toward the cylinder. In the present head structure, the head is relieved in alignment with the port to allow the fluid to pass readily around the rod and then into the cylinder. The sectional area between the rod and port to bore intersection is generally as large or larger than the sectional area of either the port or the annular passage between the rod and wall 38. Thus, the enlarged bore portion 28 provides a passage around the piston rod for the flow of fluid which is not the controlling restriction in the flow path through the head.

Various configurations of the bore through the head may be utilized to avoid restriction at the point of intersection between the port and the stepped bore through the head. In Figure 4, it will be noted that a radial step 40 is provided between the bore sections 20 and 28. In Figure 5, a transition section 41 sloping between the larger bore portion 28' and the smaller bore portion 29' is illustrated. Conditions of use may require the use of one type of transition section between portions of the bore rather than the other. It is fully contemplated that other configurations of transition sections could be used. In either event, the portion 38 of the head against which pressure in the cylinder will bear is of sufficient width to fully use the metal of the head to resist the pressure.

The foregoing detailed description has been given for clearness of understanding only, and no unnecessary limitations should be understood therefrom, for some modifications will be obvious to those skilled in the art.

We claim:

1. In a piston and cylinder device, a square cylinder head having bores in the corner portions for receiving tie rods to hold the head on the cylinder, said head having a central stepped bore for reciprocally passing a piston rod therethrough, said bore having a large diameter portion extending inwardly from one face of the head, an intermediate diameter portion and a smaller diameter portion extending inwardly from the opposite face of the head, said large diameter portion being adapted to receive a piston rod bushing for guiding the rod concentrically through the bore, said opposite face portion of the head having a circular groove therein having a bottom wall, an inner wall and an outer wall, the outer wall being formed accurately concentric with said large diameter portion of said stepped bore, a cylinder having an outer wall portion on the end thereof concentric with the interior of the cylinder, said cylinder outer wall engaging said groove outer wall upon assembly of said head and cylinder, said cylinder having a shoulder to engage said opposite face of the head to hold said cylinder out of contact with the bottom wall and said groove being wider than said cylinder to prevent contact between said cylinder and inner groove wall thereby permitting said engaging walls to hold the cylinder concentric with the central bore in said head after assembly, means forming a lateral port in the head communicating with the intermediate portion of said stepped central bore, said intermediate portion being enlarged in transverse alignment with the port to provide a flow area between said port and intermediate bore intersection and the piston rod immediately opposite the port at least equal to the port area.

2. In a piston and cylinder device, a cylinder head having a central axis for colinear alignment with the axis of the cylinder, one face of said head having a circular groove therein with an outer wall formed concentric to said central axis, a cylinder having an end portion formed with an outer surface for engaging only said outer wall of said groove, said cylinder having an interior concentric with said end portion outer surface so that assembly of the head and cylinder provides said colinear alignment, said head having a stepped bore therethrough centered on said axis for receiving a piston rod and for engaging a piston rod bushing and seal assembly, a piston rod bushing engaging said stepped bore and holding the piston rod aligned colinear with said cylinder, said seal assembly projecting into the centermost portion of the stepped bore, means forming a fluid port in the head intersecting said centermost portion of the bore for passing fluid from the bore around the piston rod and seal assembly and then longitudinally of the piston rod into the cylinder, providing a fluid flow passage between the port and cylinder, in section at least as large as the smallest cross-sectional area in the flow passage through the cylinder head, said centermost portion of the stepped bore being enlarged in alignment laterally with the port so as to provide a flow passage through the head without restriction by said seal assembly opposite the intersection of said port and stepped bore.

References Cited in the file of this patent

UNITED STATES PATENTS

| 2,293,167 | Overbeke | Aug. 18, 1942 |
| 2,314,683 | Berry | Mar. 23, 1943 |
| 2,642,845 | Stevens | June 23, 1953 |
| 2,710,595 | Peterson | June 14, 1955 |

OTHER REFERENCES

Miller Motor Co. Bulletin, A–105g, May 3, 1954.